(12) United States Patent
Tanaka et al.

(10) Patent No.: US 6,247,977 B1
(45) Date of Patent: Jun. 19, 2001

(54) CONNECTOR FOR FLAT CABLE

(75) Inventors: Yoshiyuki Tanaka; Taro Imai, both of Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/292,966

(22) Filed: Apr. 16, 1999

(30) Foreign Application Priority Data

Apr. 27, 1998 (JP) ................................. 10-117188

(51) Int. Cl.[7] .............................. H01R 12/24; H01R 4/02
(52) U.S. Cl. ............................................ 439/874; 439/492
(58) Field of Search ................................ 439/874, 492, 439/499; 29/860, 228

(56) References Cited

U.S. PATENT DOCUMENTS

| | | | |
|---|---|---|---|
| 5,762,507 | * 6/1998 | Mochizuki et al. | 439/164 |
| 5,821,465 | * 10/1998 | Tanaka et al. | 174/88 R |
| 5,857,259 | * 1/1999 | Johnston | 29/858 |
| 5,962,813 | * 10/1999 | Shirako et al. | 174/88 R |
| 6,023,022 | * 2/2000 | Nakamura et al. | 174/88 R |

FOREIGN PATENT DOCUMENTS 9-102337    4/1997   (JP) .

\* cited by examiner

*Primary Examiner*—Khiem Nguyen
*Assistant Examiner*—Chandrika Prasad
(74) *Attorney, Agent, or Firm*—Finnegan, Henderson, Farabow, Garrett & Dunner, L.L.P.

(57) ABSTRACT

A connector for a flat cable is equipped with a resin-made holder and a resin-made cover that is mounted on the holder. The holder has two metallic bus bars for making connection of a flat cable with two electric wires. The respective bus bars are insert molded in the holder and have flat plate-like portions of connection that are arranged in the form of a flat plane by being spaced away from each other. The outer periphery of each portion of connection is exposed from the holder. The flat cable has two conductors. The respective conductors have exposed conductor portions that are extended in array. Each electric wire has a core wire portion. On the respective connection portions there are superposed their corresponding exposed conductor portions and core wire portions, respectively. The respective core wire portions are connected to their corresponding connection portions by ultrasonic welding. A horn for use in ultrasonic welding presses each core wire portion toward its corresponding bus bar and simultaneously generates ultrasonic waves. The spacing between the connection portions prevents the interference between each jig and the holder. The cover has the insulating walls that are inserted into the gap corresponding to the spacing in a state of their having been mounted on the holder.

17 Claims, 3 Drawing Sheets

CONNECTOR FOR FLAT CABLE

BACKGROUND OF THE INVENTION

The present invention relates to a connector for connecting between a flat cable and two electric wires, connecting structure and connecting method.

Between a relatively freely rotatable steering wheel and a steering column there is disposed an electric connection device (Japanese Patent Application Laid-Open Publication No. H 9-102337, to which refer). A general electric connection device is equipped with a rotary body fixed to a steering wheel side, a stationary body fixed to a steering column side, a flat cable for making connection between the rotary body and stationary body, and a connector for connecting between an end portion of the flat cable and an electric wire.

The connector is equipped with a holder, a plurality of bus bars insert molded in the holder, and insulating walls between the bus bars that are formed integrally with the holder.

Conductor portions of the flat cable are disposed between core wire portions of the electric wire and the bus bars. An anvil is applied to the underside of the bus bars and, from above the core wire portion of the electric wire, an ultrasonic welding jig is inserted between the insulating walls. Then, the jig is pressed against the core wire portion, whereby the core wire portions are ultrasonically welded to the bus bars jointly with the conductor portions.

SUMMARY OF THE INVENTION

In the case of the above-described conventional connector, the size of the jig is limited to a range enabling the jig to be inserted into between the insulating walls. For this reason, in a case where the core wire portion is located at a position deviated from the position at which the core wire portion is preset, or where the core wire portion is not sufficiently twisted, there is the possibility that the core wire portion will get out of the position corresponding to the bus bar due to the pressing of the jig. The core wire that has gotten out of the bus bar is likely to further extend laterally (in the widthwise direction of the bus bar) due to the application thereto of the ultrasonic vibration energy and intrude into the insulating walls.

This intrusion phenomenon is difficult to discover through visual observation. When the core wire portion has deeply been intruded into the insulating walls, there is a fear that the insulation between the adjacent line circuits will fail to be maintained. Therefore, it is necessary to prevent the occurrence of such intrusion phenomenon and this makes the operation difficult to perform.

Especially, the increase in the number of signal line circuits due to an increase in the function of on-vehicle loaded appliances necessitates the performance of the connection within a limited space and hence the thinning in thickness of the insulating walls and the decreasing of the pitch between the line circuits. Therefore, the operation becomes further complex.

Accordingly, the object of the present invention is to provide a connector for a flat cable which makes it possible to ensure the insulation between the adjacent line circuits of the portions to be connected together through the performance of simple operations.

To attain the above object, the present invention is equipped with a resin-made holder and a cover mounted on the holder. The holder has two bus bars for electrical connecting a flat cable with two electric wires. Each the bus bar is insert molded in the holder and has a flat plate-like connecting portion. The connecting portions are arranged generally on a plane and spaced away from each other. The outer peripheral surface of each the connecting portion is exposed from the holder. The flat cable has two conductors. Each the conductor has an exposed conductor portion to be connected to each the connecting portion. Each the electric wire has a core wire portion to be connected to each the connecting portion by ultrasonic welding. A jig for use in ultrasonic welding presses the core wire portion toward the bus bar and generats ultrasonic waves. A space between the connecting portions prevents interference between the jig and the holder. The cover has an insulating wall inserted into the space between the connecting portions.

In the above-described construction, since the space between the connecting portions prevents the interference between the jig and the holder, the jig can be freely set to have a dimension and shape capable of preventing the deviation thereof from the core wire. For example, it is possible to form in the jig a recessed portion that comes in contact with the core wire portion as the recessed portion covers the core wire portion. As a result of this, the core wire portion is ultrasonically welded to the bus bar in a state of it being enclosed within the recessed portion and so the spreading thereof is suppressed with the result that the core wire portion is prevented from getting out of the bus bar.

Also, the space between the connection portions prevents the interference between the jig and the holder and so the operation of pressing the core wire portion by the jig and applying an ultrasonic wave energy is easy to perform.

Also, the outer periphery of the connection portion is exposed from the holder and so it is possible to easily confirm the ultrasonically welded connection portions with the naked eyes.

Further, the respective line circuits of the bus bars are isolated from each other by the insulating wall of the cover that is mounted on the holder after ultrasonic welding has been performed. Accordingly, the state of insulation between the adjacent line circuits is ensured against the vibration stress that occurs after loading onto a vehicle.

Each the exposed conductor portion may be arranged between each the connecting portion and each the core wire portions, and each the core wire portion may be connected to each the connecting portion by ultrasonic welding jointly with each the exposed conductor portion.

In this case, a recessed portion that opens wider than the width of the connecting portion and that comes in contact with the core wire portion as the recessed portion covers the core wire portion may be formed in the jig.

In the above-described construction, each the conductor portion, each the core wire portion, and each the connecting portion are collectively ultrasonically welded. At this time, the spreading of the core wire portion is suppressed, thereby enabling ultrasonic welding to be performed within the width of the bus bar.

DESCRIPTION OF THE PREFERRED EMBODIMENTS

An embodiment of the present invention will now be explained with reference to the drawings.

Figure 3:
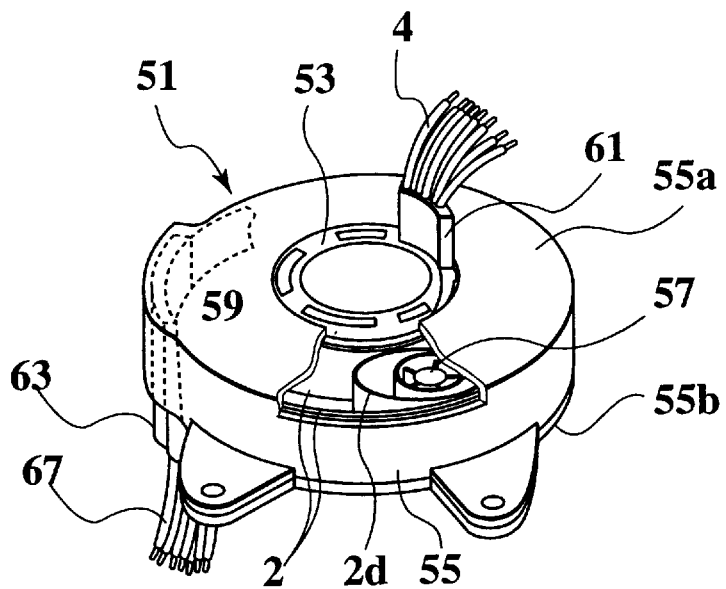
FIG. 3 is a perspective view illustrating an electric connection device for making connection between a steering wheel and a steering column.

As illustrated in FIG. 3, an electric connection device 51 has a cylindrical rotary body 53, an upper cover 55a and under cover 55b constituting a housing 55, a flexible flat cable 2, a guide roller 57, and two connecting elements 61, 63. Onto the rotary body 53 there is inserted a steering wheel shaft not illustrated. The housing 55 is fixed on the steering column side and supports the rotary body 53 rotatably. The flat cable 2 and guide roller 57 are accommodated in an annular space 59 between the rotary body 53 and the housing 55. The connecting element 61 is fixed to the rotary body 53 and the connecting element 63 is fixed to the housing 2. Both ends of the flat cable 2 are connected to the connecting elements 61, 63, respectively. And the flat cable 2 is folded back within the space 59.

An inner side portion of the flat cable 2 as viewed from an inverted portion 2d is wound around an outer peripheral surface of the rotary body 53 while, on the other hand, an outer side portion thereof is wound around an inner peripheral surface of the under cover 55b in a direction reverse from that in the case of the inner side portion.

Both ends of the flat cable 2 are electrically connected to electric wires 4, 67, respectively, through the connecting elements 61, 63. For example, the inner end of the flat cable 2 is connected to various switches (not illustrated) on the steering wheel side through the electric wire 4 and the outer end thereof is connected through the electric wire 67 to a control circuit (not illustrated) on the steering column side.

The two connecting elements 61, 63 are of substantially the same construction. Therefore, one connecting element 61 alone will hereafter be explained in detail.

Figure 4:
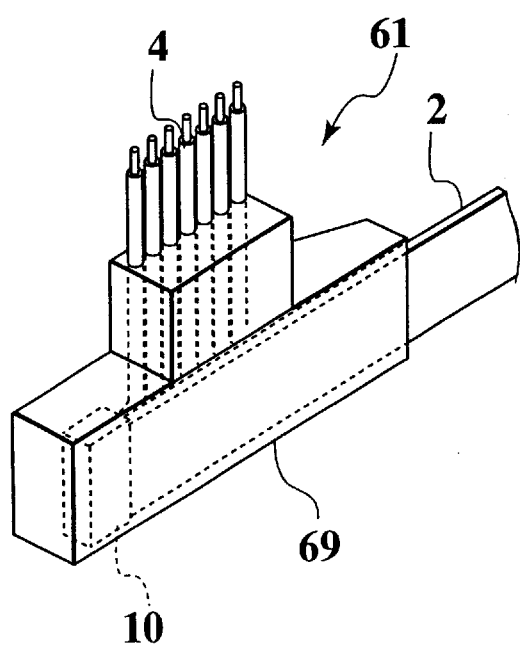
FIG. 4 is an entire perspective view illustrating a connecting element that includes the connector of FIG. 1.

As illustrated in FIG. 4, the connecting element 61 comprises a connector 10 for connecting an end of the flat cable 2 and ends of electric wires 4 to each other, and a synthetic resin material 69 that covers the connector 10 from around the same in such a way that this covering partially includes the flat cable 2 and electric wires 4. The connecting element 61 is formed using an insert molding technique.

Figure 1:
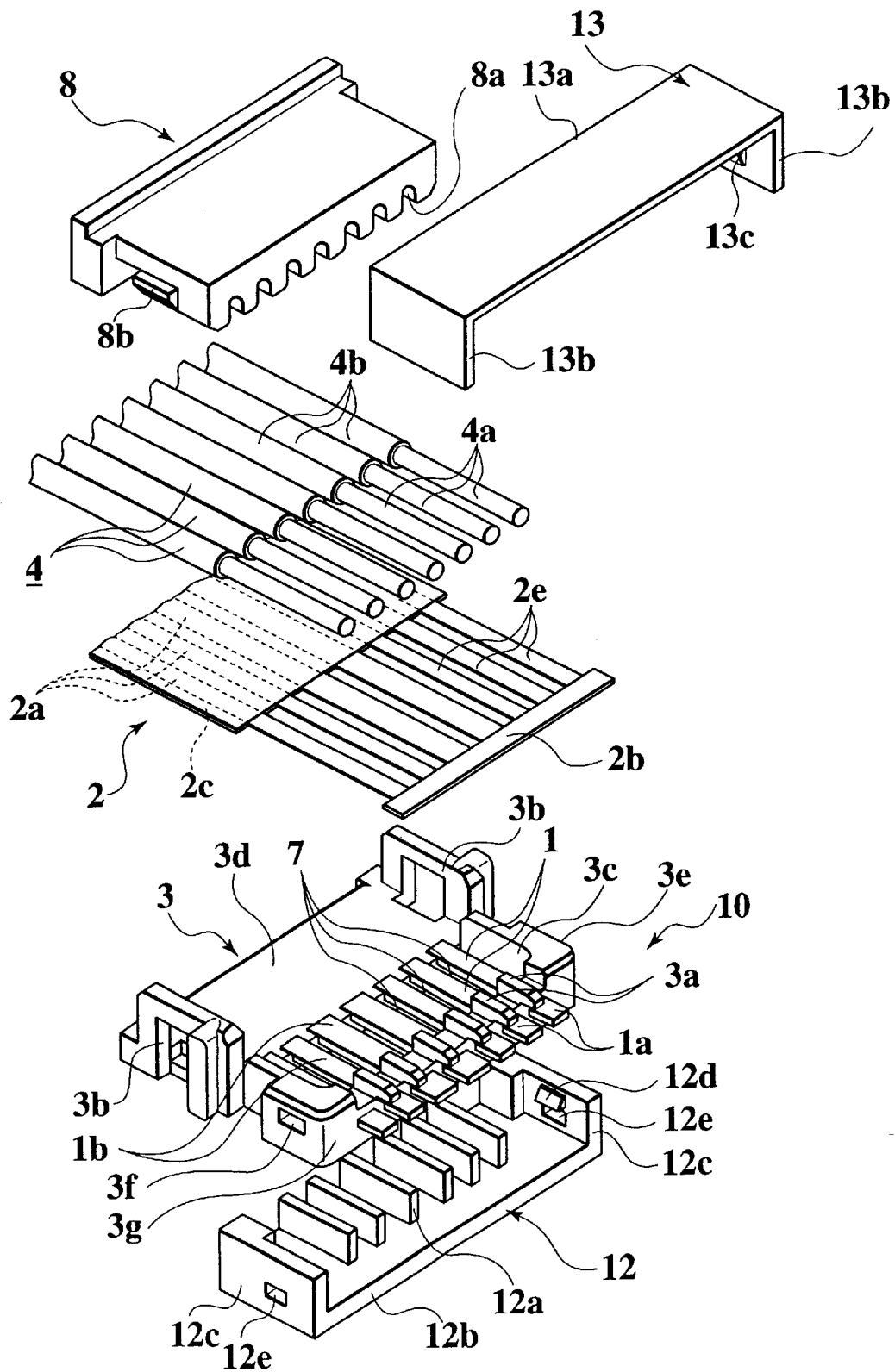
FIG. 1 is an exploded perspective view illustrating a connector according to an embodiment of the present invention.

As illustrated in FIG. 1, the connector 10 comprises a holder 3, an electric wires holder 8, a lower cover 12, and an upper cover 13. Each of these elements is made of synthetic resin having an insulating property.

The flat cable 2 is constructed of a plurality of (seven) thin plate-like conductors 2a that are arranged substantially in parallel with one another and an insulating cladding portion 2c that covers the conductors 2a. Each conductor 2a has an exposed conductor portion 2e that protrudes from the insulating cladding portion 2c. A forward end of the exposed conductor portion 2e has provided thereon an ear portion 2b at which the insulating cladding portion 2c partially remains.

Each of a plurality of (seven) electric wires 4 that correspond to the conductors 2a is constructed of a core wire portion 4a and a cladding portion 4b for covering the core wire portion 4a.

The holder 3 is equipped with a flat plate-like flat cable retaining portion 3d, two extended portions 3e that extend from the flat cable retaining portion 3d in such a way as to oppose each other, and a connecting portion 3g that makes connection between forward ends of the extended portions 3e. The flat cable retaining portion 3d, extended portions 3e and connecting portion 3g define a substantially rectangular window portion 3c.

Both side portions of the flat cable retaining portion 3d have formed therein frame-like engagement portions 3b, respectively. Outer surfaces of the extended portions 3e have formed therein engagement holes 3f, respectively. On the connecting portion 3g there are formed projecting portions 3a.

A plurality of (seven) flat plate-like metallic bus bars 1 are insert molded in the holder 3. The bus bars 1 extend from inside the flat cable retaining portion 3d to within the window portion 3c and thereby pass through the connecting portion 3g. The bus bars 1 have connecting portions 1b that are arranged within the window portion 3c in parallel with one another on a planar basis. The connecting portions 1b are disposed at the same pitches as those at which the exposed conductor portions 2e of the flat cable 2 are disposed. The outer periphery of the connecting portion 1b is exposed from the holder 3, and space portions 7 are provided between the connecting portions 1b that adjoin to one another. The respective core wire portions 4a are connected, by ultrasonic welding, to their corresponding connecting portions 1b jointly with the exposed conductor portions 2e.

The electric wire holder 8 has a plurality of (seven) retaining recessed portions 8a and engagement pawls 8b that are respectively freely engageable with the engagement portions 3b. The retaining recessed portions 8a are disposed at the same pitches as those of the exposed conductor portions 2e of the flat cable 2 and these recessed portions 8a are superposed on the flat cable retaining portion 3d.

The upper cover 13 has a flat plate portion 13a that cover the window portion 3c from over the same in the figure, and side wall portions 13b that extend from both ends of the flat plate portion 13a in such a way as to oppose each other. Engagement projections 13c project from inner surfaces of the respective side wall portions 13b.

The under cover 12 has a flat plate portion 12b that covers the window portion 3c from under the same in the figure, and side wall portions 12c that extend from both ends of the flat plate portion 12b in such a way as to oppose each other. Each side wall portion 12c has formed therein an engagement projection 12d that is freely engageable with the engagement hole 3f, and an engagement hole 12e that is freely engageable with the engagement projection 13c. A plurality of (seven) insulating walls 12a are protruded from the upper surface of the flat plate portion 12. When the under cover 12 has been mounted on the holder 3, each engagement projection 12d is engaged with the engagement hole 3f and each insulating wall 12a is entered into its corresponding space portion 7.

Figure 2A:
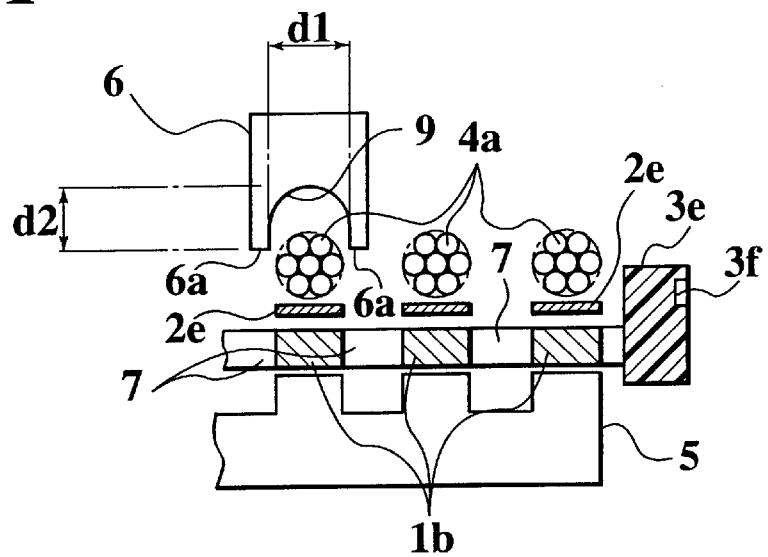
FIG. 2A is a sectional view illustrating a state of the connector of FIG. 1 at a time before ultrasonic welding is performed.

As illustrated in FIG. 2A, a jig that is used to ultrasonically weld the core wire portion 4a, exposed conductor portion 2e and connecting portion 1b is constructed of a horn 6 and an anvil 5. The horn 6 presses the core wire portion 4a toward its corresponding bus bar 1 (connecting portion 1b) and also generates ultrasonic waves. The horn 6 has formed therein a recessed portion 9 that has an opening width d1 greater than the width of the bus bar 1 and a depth d2 capable of enclosing the core wire portion 4a.

Ultrasonic welding is performed in accordance with the process steps that follow.

First, the ear portion 2b of the flat cable 2 is hooked on the projecting portion 3a of the holder 3 and the insulating cladding portion 2c is placed on the flat surface of the flat cable retaining portion 3d of the holder 3. In this state, each exposed conductor portion 2e is located on its corresponding connecting portion 1b and the ear portion 2b is retained between the projecting portion 3a and a projecting end portion 1a of the bus bar 1.

Next, the core wire portion 4a at the forward end of each electric wire 4 is disposed on its corresponding exposed conductor portion 2e. The disposing of each electric wire 4 is performed using the electric wire holder 8. Specifically, first, each electric wire 4 is fitted to within its corresponding retaining recessed portion 8a of the electric wire holder 8 and is thereby temporarily fixed. Then, the engagement pawls 8b are engaged with the engagement portions 3b, 3b, thereby fixing the electric wire holder 8 to the holder 3. In this state, the insulating cladding portion 2c of the flat cable 2 is retained between the electric wire holder 8 and the flat cable retaining portion 3d and each core wire portion 4a is located on its corresponding exposed conductor portion 2e.

Next, as illustrated in FIG. 2A, the anvil 5 is applied onto the underside in the figure of the respective exposed conductor portions 2e, and the horn 6 is pressed against the corresponding core wire portion 4a from above the same in the figure to thereby apply an ultrasonic vibration energy to it. The horn 6 is equipped with the recessed portion 9 that has the opening width d1 greater than the width of the bus bar 1 (connecting portion 1b). However, since the space portions 7 are provided between the mutually adjoining connecting portions 1b, the horn 6 can be pressed toward the anvil 5 without being in contact with the holder 3.

Figure 2B:
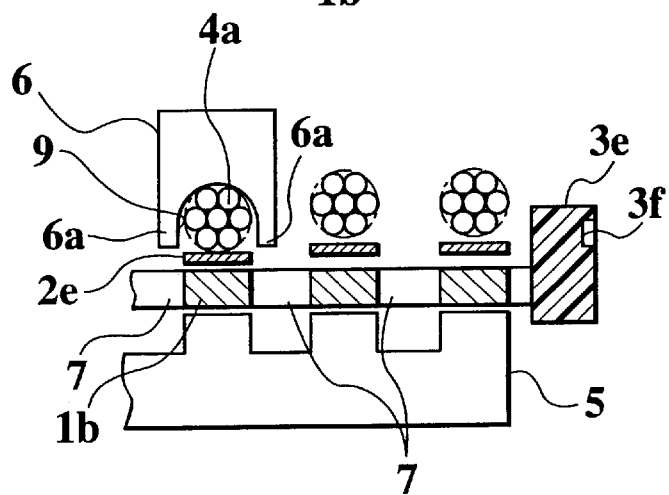
FIG. 2B is a sectional view illustrating a state in the course of ultrasonic welding of the connector of FIG. 1.

As illustrated in FIG. 2B, each core wire portion 4a is pressed toward its corresponding connecting portion 1b (corresponding exposed conductor portion 2e) in a state of its being enclosed by the retaining recessed portion 9. The retaining recessed portion 9 has the opening width d1 greater than the width of the bus bar 1. Therefore, even in a case where the core wire portion 4a is located at an improper position that gets out of the center of the connecting portion 1b, the position of the core wire portion 4a is corrected to its proper position by both side portions 6a, 6a of the retaining recessed portion 9.

The core wire portion 4a is ultrasonically welded in a state of its being enclosed by the retaining recessed portion 9. This suppresses the spreading of the core wire portion 4a at the ultrasonic welding time and thereby enables the reliable performance of a collective ultrasonic welding including the conductor portion 2a within the width of the bus bar 1. As a result of this, a state of insulation between the adjacent line circuits is ensured. It is to be noted that the spreading of the core wire portion 4a at the ultrasonic welding time is reliably suppressed by homing the core wire portion 4a beforehand prior to welding.

Also, in this embodiment, since the outer peripheral surface of the connecting portion 1b is exposed from the holder 3, the ultrasonically welded portion can be easily confirmed with the naked eyes. Through this visual confirmation, even when a product of defective connection occurs, such product of defective connection can be reliably abated in advance.

Figure 2C:
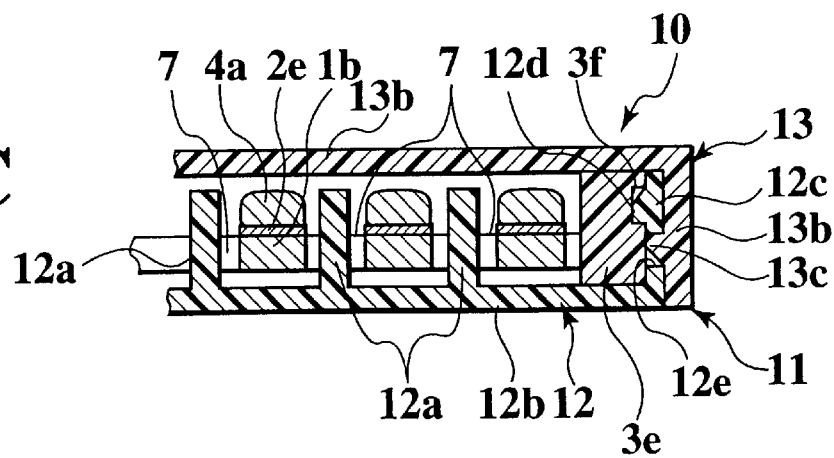
FIG. 2C is a sectional view illustrating a state of the connector of FIG. 1 at a time after ultrasonic welding is performed.

After ultrasonic welding, as illustrated in FIG. 2C, the lower cover 12 and the upper cover 13 are mounted onto the holder 3. The under cover 12 is fixed to the holder 3 by the engagement between the engagement projections 12d and the engagement holes 3f. In this state, the respective insulating walls 12a of the under cover 12 are inserted into their corresponding space portions 7. As a result of this, adjacent ones of the connecting portions 1b are isolated by the insulating walls 12a. The upper cover 13 is fixed to the under cover 12 by the engagement between the engagement projections 13c and the engagement holes 12e. As a result, the window portion 3c is covered from above and from below the same by the upper and lower covers 13 and 12.

In the connector 10, the line circuits constituted by the respective bus bars 1 are isolated from one another by the insulating walls 12a. Therefore, even when after the loading thereof onto a vehicle a vibration stress has been applied thereto, the state of insulation between adjacent ones of the line circuits is ensured.

Also, even in a case where the pitch spacing between the conductors 2a (exposed conductor portions 2e) of the flat cable 2 and between the bus bars 1 (connecting portions 1b) is small, the state of insulation between the adjacent line circuits at the time of ultrasonic welding and at a time after this welding is ensured by the recessed portion 9 of the horn 6 and the insulating walls 12a. Accordingly, it is possible to increase the number of signal line circuits without being accompanied by an increase in the size of the connector 10.

Also, although in this embodiment the exposed conductor portion 2e and core wire portion 4a have been superposed onto the connecting portion 1b and in this state the core wire portion 4a has been welded to the connecting portion 1b jointly with the exposed conductor portion 2e, only the core wire portions 4a alone can be ultrasonically welded onto the connecting portions 1b and the connections between the connecting portions 1b and the exposed conductor portions can be performed at a separate place.

What is claimed is:

1. A connector for a flat cable comprising:

a holder having a plurality of bus bars for electrical connection of a flat cable to a plurality of electric wires, each having a connecting portion spaced apart from each other, the flat cable having a plurality of conductors with an exposed conductor portion capable of contacting at least one of the bus bar connecting portions, and the electric wires each having a conductive core wire portion capable of contacting at least one of the bus bar connecting portions; and a cover mounted on the holder, the cover having at least one insulating wall inserted into the space between the connecting portions, whereby when the flat cable is electrically connected to the electric wires by a jig, interference between the jig and the holder is inhibited by the space between the connecting portions.

2. A connector according to claim 1, wherein each exposed conductor portion is arranged between one of the plurality of connecting portions and one of the plurality of core wire portions.

3. A connection structure for connecting between a flat cable and electric wires, comprising:

a plurality of electric wires, each wire having a core wire portion;

a flat cable having a plurality of conductors, each conductor having an exposed conductor portion;

a holder having a plurality of bus bars for electrical connectivity between the flat cable and the electric wires, each bus bar having a flat plate-like connecting portion capable of being in contact with at least one of the exposed conductor portions, the connecting portions arranged generally on a plane and spaced apart from each other, an outer peripheral surface of each the connecting portion exposed from the holder, each core wire portion connected to one of the plurality of connecting portions by ultrasonic welding with a jig by pressing the core wire portion with the jig toward the bus bar and then generating ultrasonic waves, the space between the connecting portions preventing interference between the jig and the holder and the jig having a retaining recessed portion with an opening width greater than the width of the bus bar; and a cover mounted on the holder, the cover having an insulating wall inserted into the space between the connecting portions.

4. A connection structure according to claim 3, wherein each exposed conductor portion is arranged between one of the plurality of connecting portions and one of the plurality of core wire portions.

5. A method of connecting a flat cable and a plurality of electric wires via a plurality of bus bars attached to a holder, each bus bar having a connecting portion spaced apart from each other, the flat cable having a plurality of conductors having an exposed conductor portion capable of contacting at least one of the plurality of connecting portions, the electric wires each having a core wire portion, the connecting method comprising the steps of:

arranging each core wire portion on one of the plurality of connecting portions; and pressing the core wire portions toward the connecting portions while applying ultrasonic waves with a jig, the jig having a recessed portion coming in contact with the core wire portions as the recessed portion covers the core wire portions, a space between the connecting portions preventing interference between the jig and the holder, each core wire portion being connected to one of the plurality of connecting portions by the ultrasonic waves.

6. A connecting method according to claim 5, wherein each exposed conductor portion is arranged between one of the plurality of connecting portions and one of the plurality of core wire portions.

7. A connecting method according to claim 5, wherein the recessed portion has a width that is larger than the width of the connecting portion.

8. A connector according to claim 1, wherein the holder includes a synthetic resin material having an insulating property.

9. A connector according to claim 1, wherein the bus bars are insert molded onto the holder.

10. A connector according to claim 1, wherein an outer peripheral surface of each connecting portion is exposed from the holder.

11. A connector according to claim 1, wherein the number of exposed conductor portions of the flat cable equals the number of conductive core wire portions of the electric wires.

12. A connector according to claim 11, wherein the number of exposed conductor portions of the flat cable equals the number of bus bar connecting portions of the holder.

13. A connector according to claim 12, wherein the flat cable contacts seven electric wires and the flat cable contacts seven bus bar connecting portions.

14. A connector according to claim 1, wherein the jig connects the exposed conductor portions of the flat cable to the core wire portion of the electric wires by an ultrasonic welding operation.

15. A connector according to claim 14, wherein the ultrasonic welding operation comprises urging the jig against the core wire portions and toward the bus bar connecting portions, and then generating ultrasonic waves from the jig to weld the core wire portions to the exposed conductor portions.

16. A connector according to claim 14, wherein the jig includes a horn and an anvil, the horn having a retaining recessed portion with an opening width greater than the width of the bus bar.

17. A connector according to claim 1, wherein at least one of the insulating walls of the cover comprises kan uninterrupted continuous surface.

* * * * *

UNITED STATES PATENT AND TRADEMARK OFFICE
CERTIFICATE OF CORRECTION

PATENT NO. : 6,247,977 B1
DATED : June 19, 2001
INVENTOR(S) : Yoshiyuki Tanaka et al.

It is certified that error appears in the above-identified patent and that said Letters Patent is hereby corrected as shown below:

Column 6,
Line 40, after "each" insert -- bus bar --.
Lines 41-42, "conductors with" should read -- conductors, each conductor having --.
Lines 44-45, "the electric wires each having a conductive core" should read -- each electric wire having a core --.
Lines 48-49, "space between the connecting portions," should read -- space at least between two of the bus bar connecting portions; --.
Line 53, before "connecting portions", insert -- bus bar --.
Line 54, after "wherein", insert -- : --.
Line 56, before "connecting portions", insert -- bus bar --.

Column 7,
Line 2, before "connecting", insert -- bus bar --.
Line 4, "surface of each the" should read -- surface of each bus bar --.
Line 7, before "connecting portions", insert -- bus bar --.
Line 10, before "connecting portions", insert -- bus bar --.
Line 12, before "recessed", delete "retaining".
Line 14, "having an" should read -- having at least one --.
Line 15, after "between", insert -- at least two of --.
Line 16, before "connecting portions", insert -- bus bar --.
Line 17, after "wherein", insert -- : --.
Line 19, before "connecting portions", insert -- bus bar --.
Line 24, after "conductors", insert -- , each conductor --.
Line 26, before "connecting portions", insert -- bus bar --.
Lines 26-27, "the electric wires each" should read -- each electric wire --.
Line 30, before "connecting portions", insert -- bus bar --.
Line 31, "pressing the core wire portions toward the connecting" should read -- pressing each core wire portion toward a corresponding bus bar connecting --.
Line 32, "portions" should read -- portion --.
Lines 34-35, "covers the core wire portions" should read -- covers each core wire portion --.
Line 35, "between the" should read -- between adjacent bus bar --.
Line 38, before "connecting portions", insert -- bus bar --.

UNITED STATES PATENT AND TRADEMARK OFFICE
CERTIFICATE OF CORRECTION

PATENT NO. : 6,247,977 B1
DATED : June 19, 2001
INVENTOR(S) : Yoshiyuki Tanaka et al.

It is certified that error appears in the above-identified patent and that said Letters Patent is hereby corrected as shown below:

Column 8,
Line 1, before "connecting portions", insert -- bus bar --.
Line 11, before "connecting portion", insert -- bus bar --.
Line 26, "wire portion" should read -- wire portions --.
Line 35, after "having a", delete "retaining".
Line 39, "comprises kan" should read -- comprises an --.

Signed and Sealed this

Twenty-third Day of April, 2002

Attest:

JAMES E. ROGAN
Attesting Officer
Director of the United States Patent and Trademark Office